United States Patent Office 3,110,713
Patented Nov. 12, 1963

3,110,713
3-METHOXYMETHYL-1-(5-NITROFURFURYLI-
DENEAMINO)HYDANTOIN
Claude Franklin Spencer, Norwich, N.Y., assignor to
The Norwich Pharmacal Company, a corporation of
New York
No Drawing. Filed June 7, 1961, Ser. No. 115,236
1 Claim. (Cl. 260—240)

This invention relates to a new chemical compound 3-methoxymethyl - 1 - (5-nitrofurfurylideneamino)hydantoin represented by the formula:

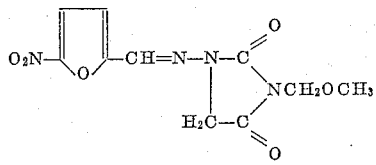

I have discovered that this new compound possesses valuable chemotherapeutic activity in preventing and treating a wide range of parasitic infections in poultry and animals when administered orally in sub-toxic quantities. It is particularly useful in combatting protozoan infections of chickens such as coccidiosis due to *Eimeria tenella* and histomonaniasis provoked by *Histomonas meleagridis*. These frequently encountered and troublesome diseases impair normal development of birds and oftentimes result in death, if left unchecked. When my new compound is incorporated in poultry feed, it is highly effective in preventing the ravages of these diseases and in benefiting the growth and development of chickens. The amount of my new compound in the feed supply may vary. I have found a concentration of from about 0.011%–0.022% by weight of the feed produces excellent results.

My new compound is also chemotherapeutically effective in the treatment of bacterial infections. When administered per os in a dose of 210 mg./kg. to mice lethally infected with *Salmonella typhosa*, protection against death is secured.

My compound is relatively non-toxic. It is tolerated in mice at a level of about 600 mg./kg. When incorporated in the feed supply of chickens at a concentration of 0.022% and that feed ingested as a prophylactic or therapeutic measure, no adverse effects are noted.

The formulation and compounding of my new compound in acceptable dosage forms such as tablets, capsules, suspensions and the like is easily carried out in accordance with conventional pharmaceutical practice using those excipients and carriers familiar in the art. When the feed supply is employed as a carrier, intimate admixture therein is readily accomplished by stirring, grinding or tumbling methods commonly used.

In order that my invention may be readily available to and understood by those skilled in the art, a method for preparing it is described briefly.

EXAMPLE I

3-Methoxymethyl-1-(5-Nitrofurfurylideneamino)
Hydantoin

A solution of 70 g. (0.6 mole) of 1-aminohydantoin in 325 ml. of acetone is heated under reflux on the steam bath for 1 hour and then evaporated to dryness. The residue is dissolved in 1700 ml. of dimethylformamide and 27 g. of 55% sodium hydride in mineral oil is added. When this reaction is complete, 48.3 g. (0.6 mole) of chloromethyl methyl ether is added. This mixture is heated at 100° for 2¼ hours and then evaporated to remove volatiles. The residue, in water containing 2 molar equivalents of concentrated hydrochloric acid is treated with charcoal and filtered. To the filtrate is added 84 g. (0.59 mole) of 5-nitrofurfural in 500 ml. of methanol. The yellow crystals are collected and washed with water and dry ether. These are dissolved in 775 ml. of warm dimethylformamide and ammonium hydroxide is added. The solution is diluted with 5 l. of water. The crystals are collected and recrystallized from 350 ml. of acetonitrile. There are obtained 58 grams of 3-methoxymethyl-1-(5-nitrofurfurylideneamino)hydantoin having a melting point of 190–191°.

For the 5-nitrofurfural employed in this example, derivatives thereof readily hydrolyzable thereto such as 5-nitrofurfural diacetate and 5-nitrofurfural oxime may be employed. When such derivatives are used, it is advantageous to supply heat to the reaction mixture to encourage hydrolysis.

What is claimed is:
3-methoxymethyl-1-(5-nitrofurfurylideneamino)hydantoin of the formula:

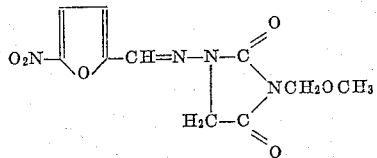

References Cited in the file of this patent
UNITED STATES PATENTS 2,610,181   Hayes _____ Sept. 9, 1952
2,927,110   Gever et al. _____ Mar. 1, 1960

OTHER REFERENCES

Ware: Chemical Reviews, vol. 46, pages 427–9 (1950).
Jack: J. Med. Pharm. Chem., vol. 3, pages 253–263 (1961).